US011350640B1

(12) United States Patent
Bullard et al.

(10) Patent No.: US 11,350,640 B1
(45) Date of Patent: Jun. 7, 2022

(54) METHODS AND RELATED APPARATUS FOR INCREASING ANTIMICROBIAL EFFICACY IN A POULTRY CHILLER TANK

(71) Applicant: Zee Company, Inc., Chattanooga, TN (US)

(72) Inventors: Jonathon R. Bullard, Chattanooga, TN (US); James A. Faller, Chattanooga, TN (US); Robert C. Bullard, Signal Mountain, TN (US)

(73) Assignee: Zee Company I, LLC, Chattanooga, TN (US)

( * ) Notice: Subject to any disclaimer, the term of this patent is extended or adjusted under 35 U.S.C. 154(b) by 134 days.

(21) Appl. No.: 15/676,622

(22) Filed: Aug. 14, 2017

Related U.S. Application Data (60) Provisional application No. 62/374,468, filed on Aug. 12, 2016.

(51) Int. Cl.
  *A23B 4/08* (2006.01)
  *A23B 4/06* (2006.01)
  (Continued)

(52) U.S. Cl.
  CPC ............... *A23B 4/08* (2013.01); *A23B 4/062* (2013.01); *A23B 4/20* (2013.01); *A23B 4/26* (2013.01); *A23V 2002/00* (2013.01)

(58) Field of Classification Search
  CPC .. A23B 4/08; A23B 4/062; A23B 4/20; A23B 4/26
  See application file for complete search history.

(56) References Cited

U.S. PATENT DOCUMENTS

| 2,347,434 A | 4/1944 | Reichert et al. |
| 2,377,038 A | 5/1945 | Reichert et al. |

(Continued)

FOREIGN PATENT DOCUMENTS

| CA | 2569025 | 6/2008 |
| EP | 1435203 | 7/2004 |

(Continued)

OTHER PUBLICATIONS

Bauermeister et al., "Validating, the Efficacy of Peracetic Acid Mixture as an Antimicrobial in Poultry Chillers", J. of Food Protection, vol. 71, No. 6, 2008, pp. 1119-1122.

(Continued)

*Primary Examiner* — Stephanie A Cox
(74) *Attorney, Agent, or Firm* — DeWitt LLP (57) ABSTRACT

Methods and related apparatus for improving the efficacy of antimicrobial agents within processing tanks. Processing tanks can include side streams for introducing antimicrobial agents into the processing tanks. The antimicrobial agents will be added and mixed in the side stream to form a processing solution. Additional actions can be conducted on the processing solution within the side stream including any and or all of heating, pumping, sampling, measuring, testing and pH adjustment of the processing solution. The processing solution is divided into at least two processing solution steams, which can be introduced at two different and distinct locations within the processing tank such as a carcass introduction end and a carcass removal end. By simultaneously introducing at least two processing solution streams at different locations of the processing tank, large concentration gradients of the antimicrobial agent are avoided.

78 Claims, 6 Drawing Sheets

(51) Int. Cl.
*A23B 4/20* (2006.01)
*A23B 4/26* (2006.01)

(56) References Cited

U.S. PATENT DOCUMENTS

| | | | |
|---|---|---|---|
| 3,104,170 A | 9/1963 | Mahon et al. | |
| 3,104,978 A | 9/1963 | Elder | |
| 3,689,283 A | 9/1972 | May et al. | |
| 4,675,947 A | 6/1987 | Clatfelter et al. | |
| 5,069,922 A | 12/1991 | Brotsky et al. | |
| 5,139,788 A | 8/1992 | Schmidt | |
| 5,143,739 A | 9/1992 | Bender et al. | |
| 5,200,189 A | 4/1993 | Oakes et al. | |
| 5,208,057 A | 5/1993 | Greenley | |
| 5,234,703 A | 8/1993 | Guthery | |
| 5,283,073 A | 2/1994 | Bender et al. | |
| 5,364,650 A | 11/1994 | Guthery | |
| 5,435,808 A | 7/1995 | Holzhauer et al. | |
| 5,489,434 A | 2/1996 | Oakes et al. | |
| 5,632,676 A | 5/1997 | Kurschner et al. | |
| 5,635,231 A | 6/1997 | Bender et al. | |
| 5,718,910 A | 2/1998 | Oakes et al. | |
| 5,863,244 A | 1/1999 | Mansfield | |
| 5,965,033 A | 10/1999 | Huss et al. | |
| 6,010,729 A | 1/2000 | Gutzmann et al. | |
| 6,103,286 A * | 8/2000 | Gutzmann | A01N 59/00 426/332 |
| 6,113,963 A | 9/2000 | Gutzmann et al. | |
| 6,183,807 B1 | 2/2001 | Gutzmann et al. | |
| 6,455,086 B1 | 9/2002 | Trinh et al. | |
| 6,514,556 B2 | 2/2003 | Hilgren et al. | |
| 6,527,872 B1 | 3/2003 | Fricker et al. | |
| 6,534,075 B1 | 3/2003 | Hei et al. | |
| 6,545,047 B2 | 4/2003 | Gutzmann et al. | |
| 6,558,620 B1 | 5/2003 | Sanford | |
| 6,605,253 B1 | 8/2003 | Perkins | |
| 6,627,593 B2 | 9/2003 | Hei et al. | |
| 6,627,657 B1 | 9/2003 | Hilgren et al. | |
| 6,964,788 B2 | 11/2005 | Phebus et al. | |
| 7,754,670 B2 | 7/2010 | Lange et al. | |
| 7,887,641 B2 | 2/2011 | Man et al. | |
| 8,020,520 B2 | 9/2011 | Hilgren et al. | |
| 8,029,693 B2 | 10/2011 | Dada et al. | |
| 8,030,351 B2 | 10/2011 | Gutzmann et al. | |
| 8,043,650 B2 | 10/2011 | Gutzmann et al. | |
| 8,057,812 B2 | 11/2011 | Man et al. | |
| 8,128,976 B2 | 3/2012 | Man et al. | |
| 8,916,510 B2 | 12/2014 | Gutzmann et al. | |
| 9,497,964 B2 | 11/2016 | Dagher et al. | |
| 10,912,321 B2 | 2/2021 | Harvey et al. | |
| 2002/0083549 A1 | 7/2002 | Deiterman et al. | |
| 2003/0148727 A1 | 8/2003 | Hilgren et al. | |
| 2003/0211169 A1 | 11/2003 | Tabasso | |
| 2006/0113506 A1 | 6/2006 | Man et al. | |
| 2006/0225439 A1 * | 10/2006 | Morris | A22C 21/00 62/64 |
| 2007/0244261 A1 | 10/2007 | Fukui et al. | |
| 2009/0043123 A1 | 2/2009 | Copenhafer et al. | |
| 2009/0143481 A1 | 6/2009 | Man et al. | |
| 2009/0145859 A1 | 6/2009 | Man et al. | |
| 2009/0311134 A1 | 12/2009 | Iwashita et al. | |
| 2009/0324790 A1 | 12/2009 | Hilgren et al. | |
| 2010/0021557 A1 | 1/2010 | Li et al. | |
| 2010/0196503 A1 | 8/2010 | Heisig et al. | |
| 2010/0227000 A1 | 9/2010 | Ames et al. | |
| 2011/0027383 A1 | 2/2011 | Hilgren et al. | |
| 2011/0135534 A1 | 6/2011 | Bates et al. | |
| 2011/0177145 A1 | 6/2011 | Erkenbrecher, Jr. et al. | |
| 2011/0220155 A1 | 9/2011 | Man et al. | |
| 2011/0274766 A1 | 11/2011 | Allen et al. | |
| 2011/0305805 A1 | 12/2011 | Gutzmann et al. | |
| 2011/0311691 A1 | 12/2011 | Gutzmann et al. | |
| 2012/0244261 A1 * | 9/2012 | Harvey | A23L 13/55 426/231 |
| 2012/0245228 A1 | 9/2012 | Harvey et al. | |
| 2012/0322872 A1 | 12/2012 | Kraus et al. | |

FOREIGN PATENT DOCUMENTS

| | | |
|---|---|---|
| GB | 947688 | 1/1964 |
| WO | WO 99/00025 | 1/1999 |
| WO | WO 02/054866 A1 | 7/2002 |
| WO | WO 2007/092087 A2 | 8/2007 |
| WO | WO 2009/027857 A1 | 3/2009 |

OTHER PUBLICATIONS

Bell, "Reduction of doodborne mirco-organisms on beef carcass tissue using acetic acid, sodium bicarbonate, and hydrogen peroxide spray washes", Food Microbiology (1997), 14, 439-448.

Carciofi et al., "Water uptake by poultry carcasses during cooling by water immersion". Chemical Engineering and Processing: Process Intensification, vol. 46, No. 5, 2007, pp. 444-450.

Dorn, "Examination of *Salmonella* Decontamination of Broiler Carcasses", 1988, 28 pages.

Gusev, "Peracetic Acid for *Salmonella* Decontamination in Poultry Carcasses", Veterinary Disease Control Review (2007), 4 pages.

Harris et al., "Microbiological and organoleptic characteristics of beef trim and ground beef treated with acetic acid, lactic acid, acidified sodium chlorite, or sterile water in a simulated commercial processing environment-to reduce *Eschenehta coli* O157:H7 and *Salmonella*", Meat Science, 90, 2012, pp. 783-788.

Joseph, "Meat Decontamination", University of Bristol (1997), pp. 1, 8-9, 12, 33-35, 38, 43, 64-91, 98-99 and 104-105.

Labadie, "Development of a New Technique for Obtaining Axenic Meat" European J. Appl. Microbiol. (1977), 4, 67-73.

Mohan et al. "Role of Peroxyacetic Acid, Octanoic Acid, Malic Acid, and Potassium Lactate on the Mictobiologicaland Instrumental Color Characteristics of Ground Beef", J. Food Science, vol. 77, No. 4, 2012, pp, M188-M193.

Nationalchickencouncil.org (Food Safety and Inspection in the U.S. Broiler Chicken Industry).

Quilo et al., "Microbial, instrumental color and sensory characteristics of inoculated ground beef produced using potassium lactate, sodium metasilicate or peroxyacetic acid as multiple antimicrobial interventions". Meat Science, 84, 2010, pp. 470-476.

Russell, "Solving the Yield/ Pathogen Reduction Dilemma", Watt 290 Poultry USA, Oct. 2007, pp. 30-34.

Application and Image File Wrapper for U.S. Appl. No. 15/436,210, filed Feb. 17, 2017, inventors Beason et al.

Bottemiller, Helena, "Russia Agrees to Lift Ban on U.S. Poultry imports". Jun. 25, 2010. https://www.foodstafetynews.com/2010/06/russia-agrees-to-lift-ban-on-us-poultry-imports/.

Young et al., Moisture Retention by Water-and Air-Chilled Chicken Broilers During Processing and Cutup Operations; 2004, pp. 119-122, Poultry Science Associatian, Inc.

May el al., Effect of Phosphate Treatment on Carcass-Weight Changes and Organoleptic Quality of Cup-Up-Chicken; 1962, pp. 24-32, University of Georgia, and Market Quality Research Division, AMS, USDA Georgia.

* cited by examiner

METHODS AND RELATED APPARATUS FOR INCREASING ANTIMICROBIAL EFFICACY IN A POULTRY CHILLER TANK

PRIORITY CLAIM

The present application claims priority to U.S. Provisional Application No. 62/374,468 filed Aug. 12, 2016 and entitled "METHODS AND RELATED APPARATUS FOR MEASURING AND ADJUSTING PROCESSING SOLUTION pH FOR POULTRY PROCESSING", which is hereby incorporated by reference in its entirety.

TECHNICAL FIELD

The present invention is related to processing systems and related methods of operation during poultry processing. More specifically, the present invention is directed to methods and related apparatus for increasing antimicrobial efficacy during poultry processing by reducing concentration gradients of antimicrobial agents within a processing tank.

BACKGROUND

Commercial poultry processing plants include variety of processing and handling steps that can allow for the retention, transportation and transfer of bacteria from carcass to carcass throughout the processing plant. Of particular concern are human pathogenic microorganisms and those whose metabolism result in rapid spoilage of meat. These microorganisms, brought into the plant in or on live carcasses, are disseminated throughout the plant as the post-kill carcasses are handled by processing personnel, touch briefly together during traverse of the shackle lines, or are dipped for periods of time in various aqueous solutions, like scald baths and chill water.

In response to the presence of bacteria, most processing plants have implemented various processes that expose poultry carcasses to desirable antimicrobial chemistries in order to reduce bacterial populations on the carcasses. While prior chemistries including sodium hypochlorite, trisodium phosphate, various organic acids, ozone, chlorine dioxide and acidified sodium provided benefits, these older technologies suffered from undesirable effects and limitations. Newer antimicrobial chemistries include the use of peroxycarboxylic acids ("PCA"), such as peroxyacetic acid ("PAA"). PAA is a highly efficacious antimicrobial that was originally used as a hard surface sanitizer, but has more recently been recognized as possessing superior antimicrobial intervention chemistries for poultry carcasses. PAA provides a broad spectrum of kill of pathogenic and spoilage bacteria while producing no undesirable chemical by-products as the PAA degrades.

PAA, which is also sometimes called peracetic acid, is a peroxycarboxylic acid and is a well known chemical for its strong oxidizing potential, has the molecular formula $CH_3COOOH$, and has a molecular structure as follows:

An equilibrium PAA solution is produced from an equilibrium mixture of hydrogen peroxide, acetic acid and water ("equilibrium PAA solution"), which often uses an acid catalyst, e.g., sulfuric acid.

PAA has a pKA of about 8.4, such that about half the PAA is active (free) and about half is dissociated (bound) at a pH of about 8.4. For example, a 100 ppm solution of PAA at a pH of about 8.4 has about 50 ppm of active (free) PAA and about 50 ppm of peracetate ion, which is about 5 to about 10 times less effective than active PAA.

U.S. Pat. No. 5,632,676, which pertains to the application of equilibrium PAA solutions to fowl at an application concentration of about 100 ppm to about 2000 ppm, discloses such equilibrium solutions having a pH around 3.

Hydrogen peroxide is always present in excess in the natural equilibrium formulation of PAA solutions (and other equilibrium PCA solutions). Both the excess hydrogen peroxide and the PCA produced in the equilibrium PCA solution (such as PAA) are the sources of the oxidative chemistry that can create undesirable organoleptic effects on poultry skin and flesh, such as extremity darkening and skin bleaching. To mitigate the development of these undesirable effects, processing plants have reduced either concentrations of equilibrium PAA solutions (and other equilibrium PCA solutions) or restricted contact times.

U.S. Pat. No. 5,632,676 includes numerous examples of equilibrium PAA solutions and concludes that the examples show that effective sanitation occurs within a narrow peracetic acid concentration range. This patent also discusses bleaching that is apparent in unadjusted or NaOH adjusted PAA solutions compared to a solution adjusted to pH 5 with disodium phosphate. Published Patent Application No. 2012/0244261 also discusses providing a solution of PAA-containing water in a reservoir, measuring the pH in the reservoir, and then pH adjustment before processing with a source of alkali, pH determination in the reservoir during processing with pH adjustment as necessary during processing with a source of alkali to increase the weight of the processed poultry product, with the alkali adjusted PAA solutions having a pH between about 6 to about 9 in the processing reservoir before processing begins and during the processing.

Because of the importance of pH in driving the equilibrium equation to proper concentrations of PAA, it would be advantageous to improve upon the accuracy of pH measurement and consistency within of pH within the processing systems. It would also be advantageous to properly monitor and maintain the pH of PAA during processing to determine the proper active PAA compared to peracetate ions in the solution during processing. Still further, due to the amount of organic material in the processing tank, it would be advantageous to have accurate monitoring of the pH of the processing solution without having to routinely clean the pH probes that can be fouled by the organic material. Finally, it would be advantageous to improve upon existing processing systems so as to reduce concentration gradients across a processing tank, as well as to increase the antimicrobial efficacy of intervention processing solutions in processing tanks.

SUMMARY

Various aspects of the present invention include both methods and related apparatus as well as systems for improving the efficacy of antimicrobial agents within processing tanks. Typically, methods, apparatus and systems of the present invention will involve the use of side streams to add appropriate antimicrobial agents into the processing tanks. Within these side streams, the antimicrobial agents will be added to a source solution and mixed to form a processing solution within the side stream. In some embodiments, the source solution is fresh water, while in some other embodiments the source solution may be a recycled, reclaimed and/or reused processing solution comprising one or more intervention solution components, such as a peroxycarboxylic acid, PAA, sodium hypochlorite or other processing chemistries. Depending upon the application, additional actions can be conducted on the processing solution within the side stream including any and or all of heating, for example, with heat exchangers, pumping, sampling, measuring, testing and/or pH adjusting the processing solution.

The invention may generally further comprise the processing solution having at least two distinct streams, for example, a first and second processing solution stream, wherein the at least two distinct streams will be introduced at two different and distinct locations within the processing tank. For instance, the first processing solution stream can be introduced proximate a carcass introduction location of the processing tank, while the second processing solution stream can be simultaneously introduced at a carcass removal location of the processing tank. In some embodiments, the first and second processing streams are provided by separate processing stream sources. For instance, the first processing stream may be a source of fresh water mixed with an intervention chemistry, while the second processing stream may be a recycled, reclaimed or reused processing source mixed with an intervention chemistry. In some other embodiments, a single processing solution is provided that can be divided into the first and second processing streams. In some embodiments, the processing solution can be divided into additional streams that can be introduced at various locations between the carcass introduction location and the carcass removal location of the processing tank. By simultaneously introducing at least two processing solution streams at different locations of the processing tank, large concentration gradients can be avoided with the processing tank such that each animal carcass is exposed to sufficient amounts of the antimicrobial agent across a length of the processing tank. Furthermore, reduced amounts of antimicrobial agent can be utilized as there is no longer the necessity to add excessive amounts of the antimicrobial agent at an upstream side of the processing tank to ensure that adequate levels of the antimicrobial agent are present at the downstream side. Various aspects of the present invention have been found to be especially useful when the processing tank comprises a poultry chiller tank for cooling poultry carcasses.

In another aspect, the present invention improves upon pH control and consistency within processing systems having an antimicrobial solution by adding a pH adjusting product and/or peroxycarboxylic acids, such as PAA, to the inlet piping system or to a tank in a side or ancillary system, such that the pH adjusting product is thoroughly mixed with the peroxycarboxylic acid prior to its introduction into a processing tank system, such as a chiller tank.

In some embodiments, the ancillary system can comprise one or more of the various piping of the processing tank system, for example, inlet flow piping, makeup flow piping, and tank recirculation piping. In such aspects, the processing water can have a pH between about 7 and 12 prior to addition of the peroxycarboxylic acid, in other aspects a pH between about 7.5 and 9. Once the peroxycarboxylic acid is added to the processing water, the solution is thoroughly mixed before pH determination and introduction of the processing solution into the processing tank.

In some other embodiments, the ancillary system can comprise one or more stand-alone tanks, for example, a mixing tank or similar reservoir, which supplies the processing solution having the desired pH to the processing tank system. Through the mixing of the processing water with the peroxycarboxylic acid and pH determination in an ancillary system, pH need only be measured once (in the ancillary system) as the velocity of the water in the ancillary system (either piping or stand-alone mixing tank) and the associated high Reynolds number, resulting in the processing solution having the desired pH between about 7 and about 12, in some other instances between about 7.5 and 11, and other instances between about 8.0 and 10.0, being thoroughly mixed prior to being introduced into the process tank. As all of the water entering the tank (either incoming, rinse, or recirculation) is at the same pH, consistent pH contacts each poultry carcass as the birds travel from a front end to a back end of the processing tank.

In some embodiments, the pH of the processing solution can also be determined in the overflow of the processing tank. As all of the water entering the tank travels from the front end to the back end of the processing tank, the overflow at the back end of the processing tank will provide an accurate pH determination after the carcasses travel the entire distance of the processing tank. In other words, determining the pH of the processing solution after it exits the processing tank will provide a more accurate determination of the pH than in the tank itself where processing has not been completed or organic material can build-up.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Representative embodiments of the present invention provide methods and systems for improving the efficacy of antimicrobial agents in processing tanks by eliminating large concentration gradients across the length of the processing tank. In some embodiments, the invention can include consistently exposing poultry carcasses to a process solution having a similar concentration prior to introduction into a first end of a processing tank and upon exiting a second end of a processing tank. While the processing solution of the present invention is discussed in reference to a peroxycarboxylic acid, such as PAA, one of ordinary skill in the art will appreciate that the present invention is applicable to one or more antimicrobial components used in processing poultry.

In some embodiments, the invention can include consistently exposing poultry carcasses to process solution having similar pH prior to introduction into a first end of a processing tank and upon exiting a second end of a processing tank. Representative embodiments of the present invention utilize one or more ancillary systems for introducing a processing solution having at least one peroxycarboxylic acid in a processing water having a pH of about 7 to about 10 that is thoroughly mixed prior to introduction into the processing tank, such that the processing tank will not experience zones having different pH levels. In some embodiments, the ancillary system can comprise a piping inlet or piping recirculation loop in which the peroxycarboxylic acid is added to a processing water having a desired pH and thoroughly mixed prior to its introduction to the processing tank. In some embodiments, the ancillary system can comprise a storage tank or similar style reservoir into which the peroxycarboxylic acid is added to the processing water having a desired pH and mixed prior to its introduction to the processing tank. In some aspects, a pH adjustment component may need to be added to either the processing water or processing solution in the ancillary system to obtain the desired pH of the processing solution. Regardless of the design, the ancillary system will have high velocities and corresponding high Reynolds numbers such that the processing water, peroxycarboxylic acid, and any pH adjustment product is adequately mixed providing a processing solution having a desired pH and concentration of the peroxycarboxylic acid, such as PAA, prior to introduction into the processing tank. The present invention can further include measuring the pH within the ancillary system to accurately determine pH prior to introduction into the processing tank and without concern for fouling of a pH probe that is a common occurrence due to organic material from carcasses within the processing tank itself.

Figure 1:
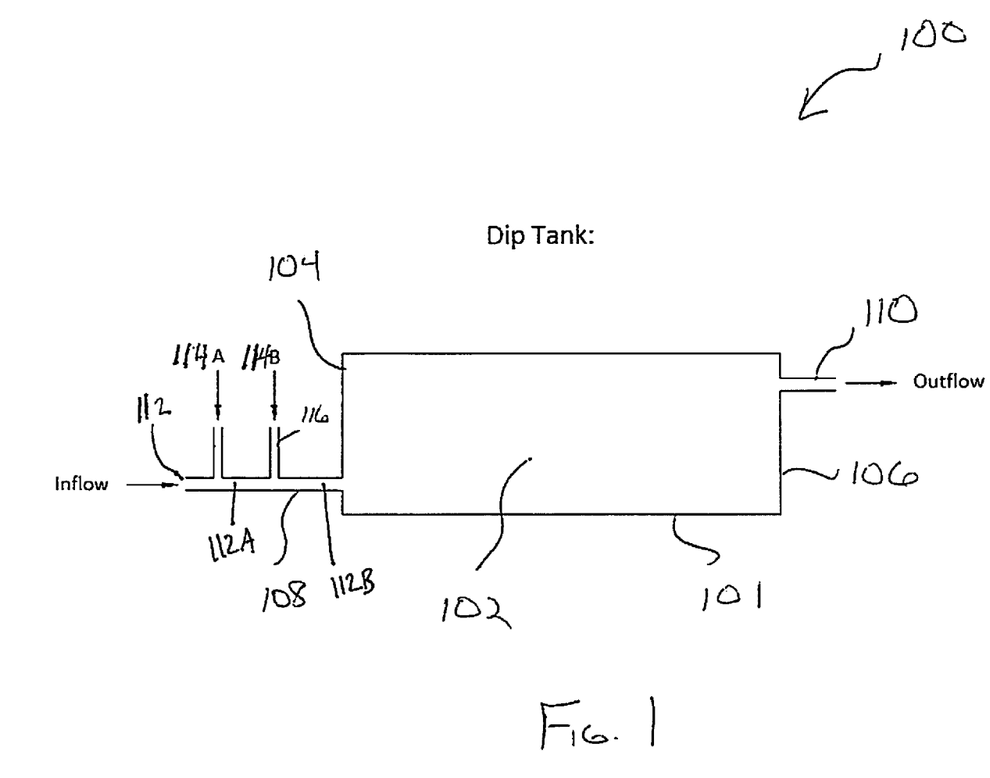
FIG. 1 is a schematic illustration of a poultry carcass dip tank according to a representative embodiment of the present invention.

In a first embodiment as illustrated in FIG. 1, a poultry processing system 100 of the present invention can comprise a process tank 101 such as, for example, a dip tank including a processing solution 102. The processing solution 102 generally comprises a processing water containing a peroxycarboxylic acid, preferably PAA, wherein the processing water was provided at a desired pH that is advantageous for processing and rinsing poultry carcasses and mixed with the peroxycarboxylic acid prior to being provided in the process tank 101. The process tank 101 generally comprises a first end 104 and a second end 106, wherein an inflow pipe 108 introduces the processing solution 102 into the process tank 101 and an outflow pipe 110 removes the processing solution 102 from the process tank 101.

As illustrated in FIG. 1, the inflow pipe 108 can comprise an ancillary water inflow portion 112, and one or more ancillary systems 114a and 114b can be used to supply a pH adjustment product and intervention chemistry, such as peroxycarboxylic acid, preferably PAA, to the inflow pipe 108 prior to the processing solution being introduced into the process tank 101. For example, the inflow pipe 108 can comprise a water supply 112 into which the pH adjustment product is directly added by ancillary system 114a, to the extent necessary, to provide a processing water. The processing water having the desired pH can then have the intervention chemistry, such as peroxycarboxylic acid, preferably PAA, added by ancillary system 114b. For example, the pH of the water inflow supply 1122 can be measured such that the pH adjustment product can be added to the water supply 112 through the use of a conventional metering pump or through a venturi injector or the like to obtain the desired pH of the processing water, preferably between about 7 and about 10. Generally, the flow of the water supply 112 with respect to ancillary system 114a should have a high enough velocity and correspondingly, Reynolds number to thoroughly mix the pH adjustment product into the water supply 112 to provide a processing water 112a having the desired pH before it is introduced into the inflow pipe 108. The pH of the supply water 112 and/or the processing water 112a can be determined in the inflow pipe 108 prior to the introduction of any intervention chemistry, such as peroxycarboxylic acid. Similarly, the flow of the processing water 112a having the desired pH with respect to ancillary system 114b should have a high enough velocity and correspondingly, Reynolds number to thoroughly mix the intervention chemistry, such as peroxycarboxylic acid, preferably PAA, into the processing water 112a to provide a processing solution 112b before it is introduced into the inflow pipe 108. The pH of the processing solution 112b can be measured in the inflow pipe 108 prior to the introduction of the processing solution 112b into the processing tank 101 to confirm the desired pH of the processing solution 112b. Alternatively, the pH of the processing water 112a and the processing solution 112b can both be measured in the inflow pipe 108.

Alternatively, ancillary system 114a can comprise a mixing tank or similar reservoir into which the pH adjustment product is added to a water supply and thoroughly mixed before being introduced into the inflow pipe 108. Similarly, ancillary system 114b can comprise a tank or similar reservoir of the intervention chemistry. In this way, the pH of the processing water 112a is precisely controlled and maintained as the inflow pipe 108 delivers the processing solution 112b into the first end 104 of the process tank 100. Since the processing solution 112b contains the processing water 112a at a desired pH thoroughly mixed with the intervention chemistry, the pH of the processing solution 112b will be consistent prior to introduction into the processing tank 101. As such, pH will remain consistent throughout the process tank 101 and there will not be localized areas of higher or lower pH within the process tank 101 as a result of mixing the components within the process tank 101 that would limit the effectiveness of the processing solution in rinsing, chilling or otherwise treating the poultry carcasses. Furthermore, pH can be monitored in either the inflow pipe 108 or the ancillary systems 112a, 112b such that a pH probe/sensor is not exposed to potential fouling within the process tank 101.

Figure 2:
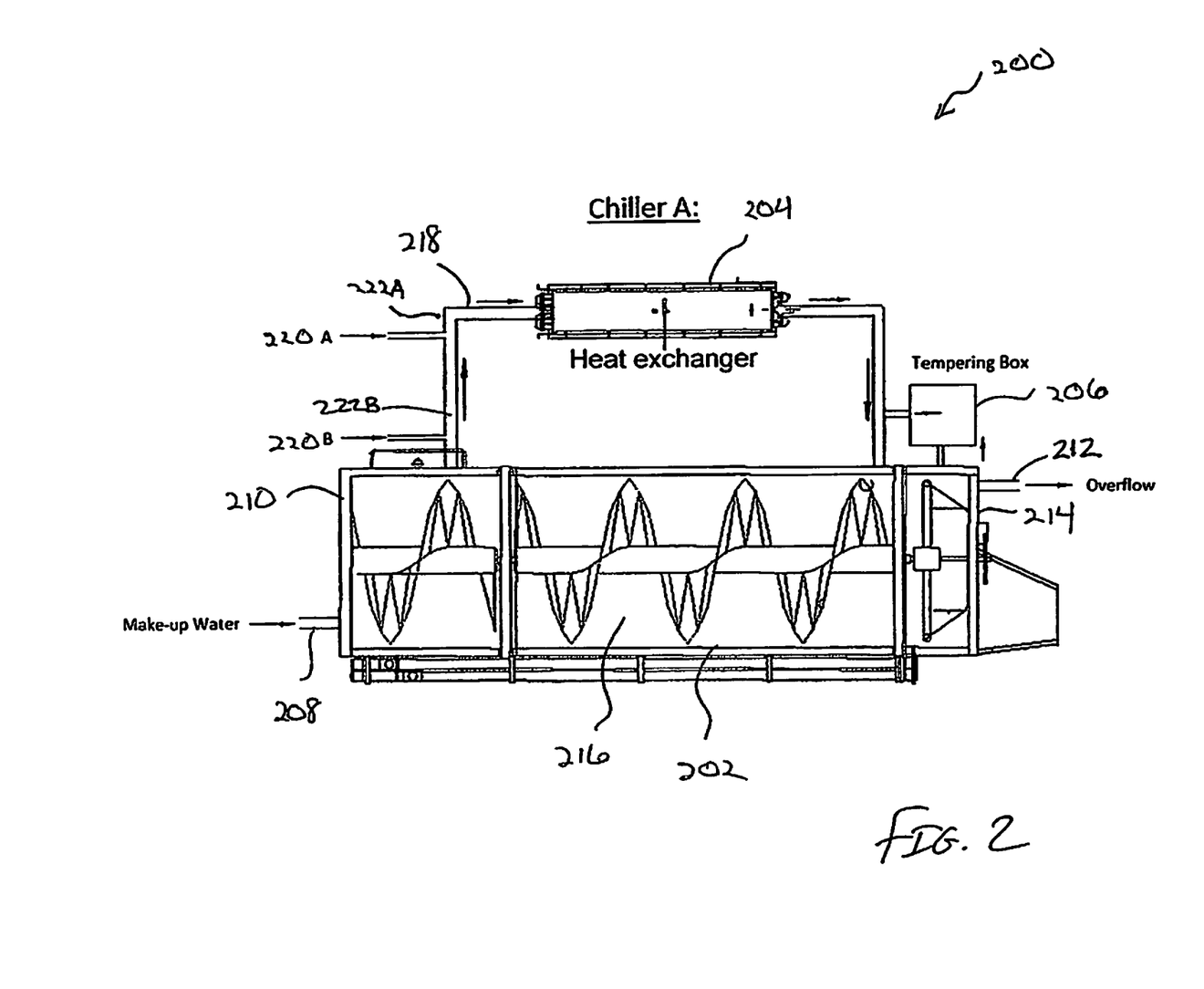
FIG. 2 is a schematic illustration of a poultry carcass water chiller tank with red water loop system according to a representative embodiment of the present invention.
Figure 3:
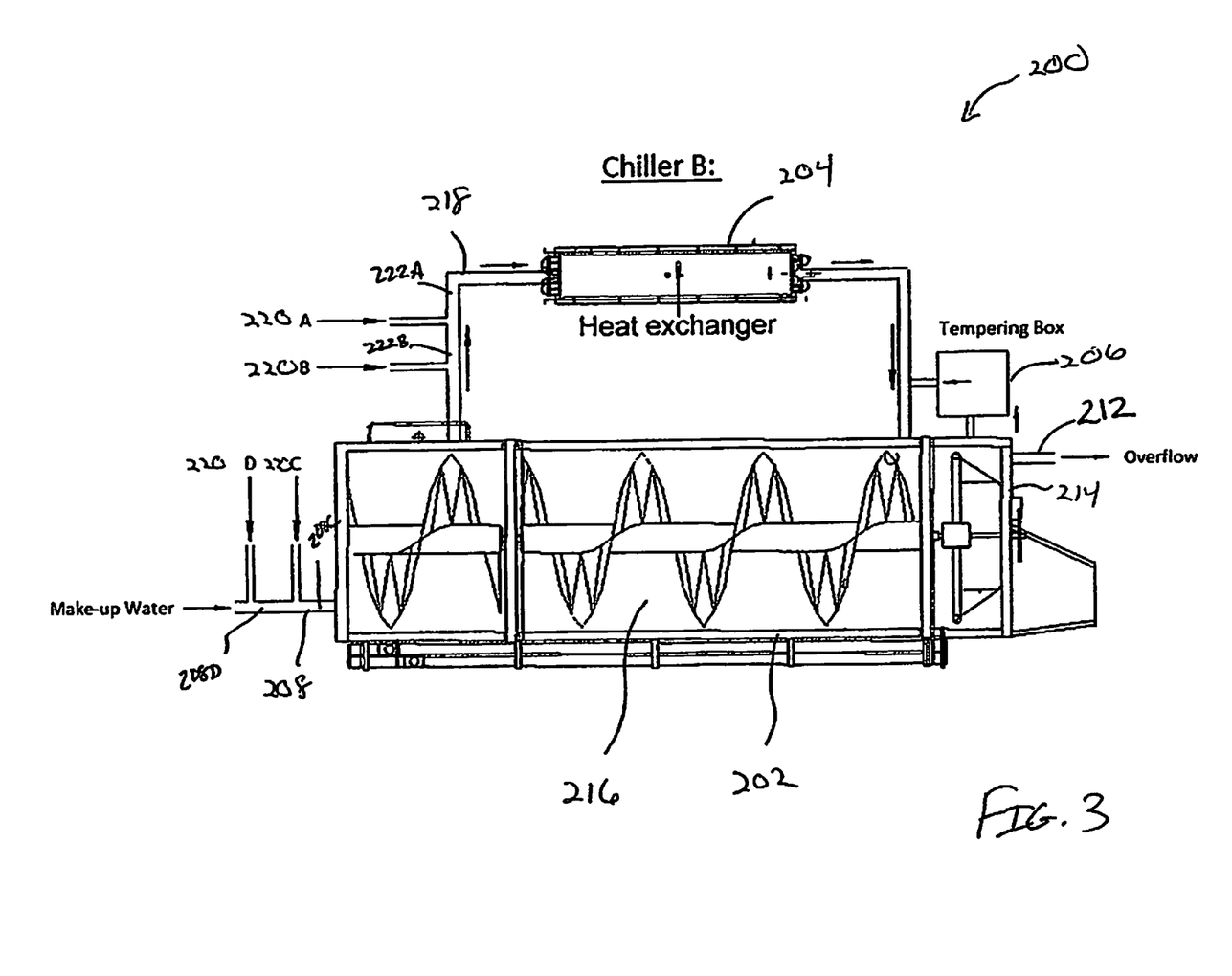
FIG. 3 is a schematic illustration of a poultry carcass water chiller tank red water loop system according to a representative embodiment of the present invention.
Figure 4:
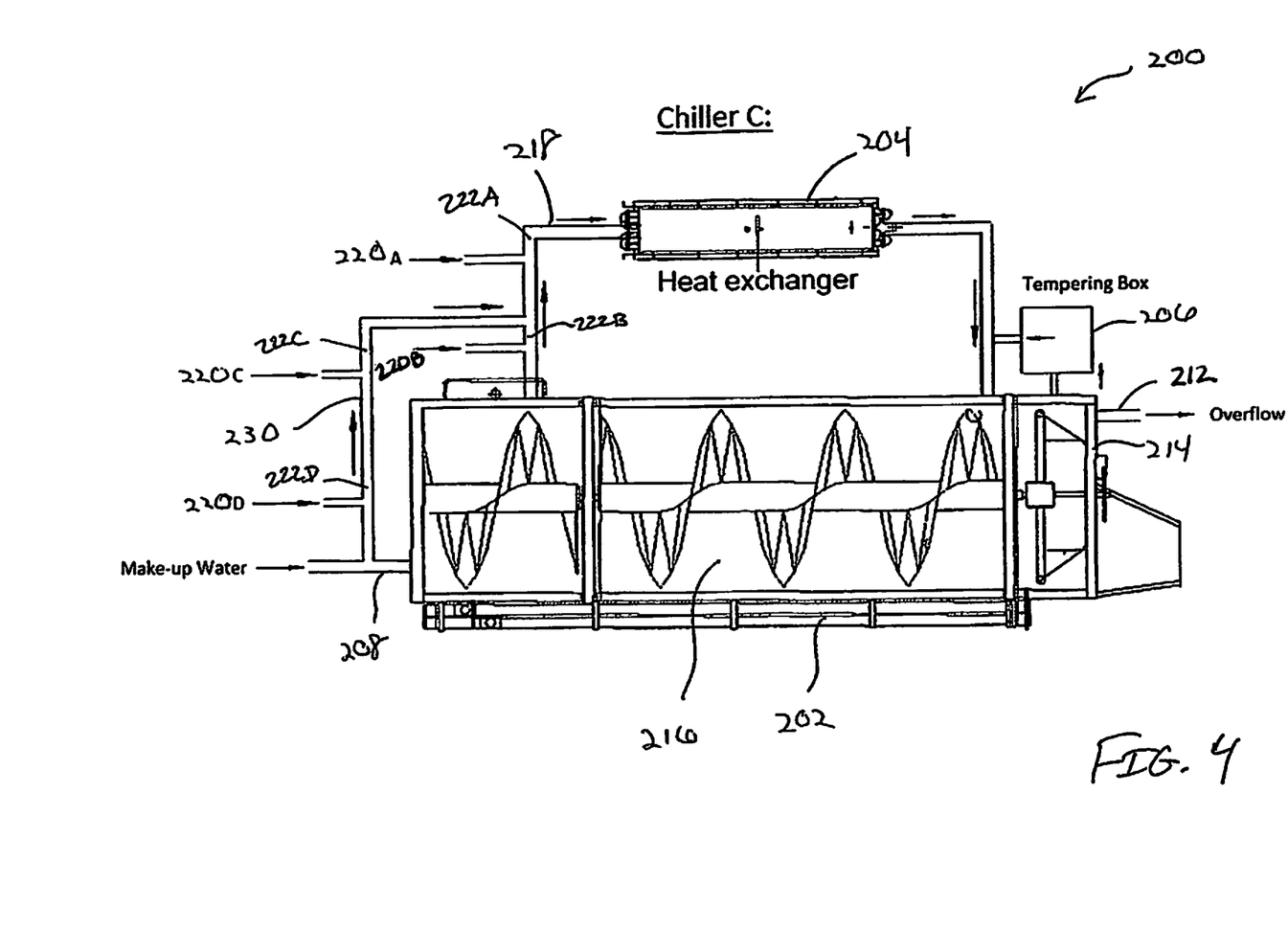
FIG. 4 is a schematic illustration of a poultry carcass water chiller tank red water loop system according to a representative embodiment of the present invention.

With reference to FIGS. 2, 3 and 4, various embodiments of a chiller tank with red water loop processing system 200 are illustrated. As will be described, the water chiller tank with red water loop processing system 200 can comprise varying levels of complexity based upon specific processing conditions, and as such, a variety of methods and system designs can be implemented to control pH within the water chiller tank with red water loop processing system.

In all of the illustrated embodiments, the chiller tank with red water loop processing system 200 comprises chiller tank 202, a heat exchanger 204 and an optional tempering box 206. In each of the embodiments, a make-up water stream 208 is supplied to a first end 210 of the chiller tank 202 while an overflow stream 212 is removed at a second end 214 of the chiller tank 202. In order to maintain temperature of a pH adjusted processing solution 216 within the chiller tank 202, a red water recirculation loop 218 supplies pH adjusted processing solution 216 from the chiller tank 202 to the heat exchanger 204, wherein the temperature of the pH adjusted processing solution is modified to the desired temperature and subsequently returned to the chiller tank 202.

With reference to FIG. 2, one or more ancillary systems 220a, 220b can supply the intervention chemistry and pH adjustment product and into the recirculation loop 218, wherein the processing solution 216 is thoroughly mixed and at the desired pH and temperature prior to introduction into the chiller tank 202. For example, ancillary system 220b can comprise a processing water supply having a pH adjustment product or the pH adjustment product that is directly added to the recirculated processing solution 216 in the red water recirculation loop 218. For example, the pH adjustment product can be added to the recirculated processing water through the use of a conventional metering pump or through a venturi injector or the like. Generally, the flow of the recirculated processing water in ancillary red water recirculation loop 218 should have a high enough velocity and correspondingly, Reynolds number to thoroughly mix the pH adjustment product into the recirculated processing water before it is introduced into the heat exchanger and chiller tank 202. Alternatively, ancillary system 220b can comprise a mixing tank or similar reservoir into which the pH adjustment product is added and thoroughly mixed with a water supply to provide a processing water supply 220b before being introduced into the red water recirculation loop 218. In this way, the pH is precisely controlled and maintained as the red water recirculation loop 218 delivers the pH adjusted processing solution 216 into the chiller tank 202. Similarly, the flow of the recirculated processing water 222b having the desired pH with respect to ancillary system 220b should have a high enough velocity and correspondingly, Reynolds number to thoroughly mix the intervention chemistry, such as peroxycarboxylic acid, preferably PAA, into the recirculated processing water 222b to provide a refreshed processing solution 222a having a desired concentration before it is introduced back into the chiller tank 202. The pH of the processing solution 222b can be measured in the inflow pipe 218 prior to the introduction of the processing solution 222a into the chiller tank 202 to confirm the desired pH of the processing solution 222a. Alternatively, the pH of the recirculated processing water 222b and the processing solution 222b can both be measured in the inflow pipe 218.

In a variation to the embodiment shown in FIG. 2, the chiller tank with red water loop processing system 200 of FIG. 3 can comprise additional ancillary systems 220c, 220d that supply the intervention chemistry and pH adjustment product, respectively, into the make-up water stream 208, such that the processing solution 216 is added at the first end 210 of the chiller tank 202 in a manner similar to that as previously described with respect to the processing solution 112b of the poultry processing system 100. In this manner, the processing solution 208c having the desired pH and intervention chemistry concentration is added to the chiller tank 202 at the first end 210 to provide a processing solution 216 within the chiller tank 202.

Finally in the embodiment illustrated in FIG. 4, the chiller tank with red water loop processing system 200 can further comprise a bypass loop 230 that introduces additional residence time and consequently, mixing of the pH adjustment product before it is introduced into the chiller tank 202. As illustrated, the bypass loop 230 can fluidly interconnect the make-up water stream 208 with the recirculation loop 218. In this way, one or more ancillary systems 220a, 220b, 220c, 220d can be utilized to introduce the intervention chemistry (220a, 220c) and pH adjustment product (220b, 220d) at an advantageous location prior to its introduction into the chiller tank 202. For example, ancillary systems 220d can be utilized to supply the pH adjustment product directly into the water within the bypass loop 230, while ancillary system 220b can supply the pH adjustment product into the recirculation loop 218 at a point upstream of the connection to the bypass loop 230. In an embodiment, ancillary system 22c can add intervention chemistry to the processing water 222d to provide a processing solution 222c before being introduced into the recirculation loop 218. In yet another alternative embodiment, ancillary system 220a can add all or additional intervention chemistry to the recirculation loop 218 at a point downstream of the connection to the bypass loop 230 containing processing solution 222c and recirculated processing solution 222B. The location of the ancillary systems in the chiller tank processing system 200 can be advantageously selected to make use of high velocities and Reynolds numbers to thoroughly mix the pH adjustment product and/or intervention chemistries prior to its introduction and/or reintroduction into the chiller tank 202.

In all of the variations of the chiller tank with red water loop processing system 200 described herein, a pH sensor/probe can be positioned in locations remote from the chiller tank 202. For example, the make-up water stream 208, the recirculation loop 218 and/or the bypass loop 230 can contain pH sensor/probes that are not exposed to fouling and/or contamination that can result from exposure to poultry contaminants within the chiller tank 202. Further, the pH sensor/probes can be located after the pH adjustment product is added to provide the processing water and/or after the intervention chemistry to provide the processing solution. In this way of the pH sensor/probes maintained outside of the chiller tank, maintenance is eliminated or otherwise reduced and operators can have a higher level of confidence that pH of the processing solution and concentration of intervention chemistry is at the desired levels before being introduced into the chiller tank 202.

In each of the embodiments shown in FIGS. 1-4, the overflow 110, 210 can also have pH probe/sensors to precisely determine the pH of the processing solution 102, 216 after it exits the respective tank. By determining the pH of the processing solution after it exits the tank, the amount of active PAA can be determined as a result of the organic material in the tank, which may determine the pH level and amount of intervention chemistry in the inlet prior to being introduced into the tank.

In certain embodiments, the peroxycarboxylic acid has from 2 to 12 carbon atoms. In some aspects, the PCA solution is chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic and peroxysubric acid and mixtures thereof.

In some aspects, the processing solution in the inlet or red water recirculation loop prior to introduction into the tank has a pH above 7.0 and below 10, in other aspects between about 7.5 and about 9.5 and in other aspects between about 7.2 and 8.6.

In certain aspects, the processing solution has a concentration of peroxycarboxylic acid from about 1 ppm to about 5000 ppm, preferably from about 5 ppm to about 1000 ppm, preferably from about 10 ppm to about 200 ppm, and more preferably from about 15 ppm to about 100 ppm. In some aspects, the concentration of active peroxycarboxylic acid in the processing solution is from about 1 ppm to about 5000 ppm, preferably from about 5 ppm to about 1000 ppm, preferably from about 10 ppm to about 200 ppm, and more preferably from about 15 ppm to about 100 ppm. In some other aspects, the concentration of active peroxycarboxylic acid and active peroxycarboxylic acid ion in the processing solution is from about 1 ppm to about 5000 ppm, preferably from about 5 ppm to about 1000 ppm, preferably from about 10 ppm to about 200 ppm, and more preferably from about 15 ppm to about 100 ppm. In some aspects, the concentration of the PAA in the processing solution is between about 15 ppm and about 100 ppm, preferably between about 15 ppm and about 75 ppm, and in some other aspects between about 20 ppm and 50 ppm.

In certain aspects, the poultry tank design of the present invention having at least a first and a second processing stream is capable of maintaining less than about a 10 ppm concentration gradient across the processing length of a processing tank, in some aspects less than about an 8 ppm concentration gradient, less than about 6 ppm concentration gradient, less than about 5 ppm concentration gradient, less than about 4 ppm concentration gradient, and in other aspects less than about a 3 ppm concentration gradient across the processing length of the processing tank. In certain aspects, the concentration gradient across the processing length of the processing tank of the present invention is between about 1 ppm and about 10 ppm, between about 2 ppm and 8 ppm, and in some other aspects between about 3 ppm and 5 ppm.

Testing

Figure 5A:
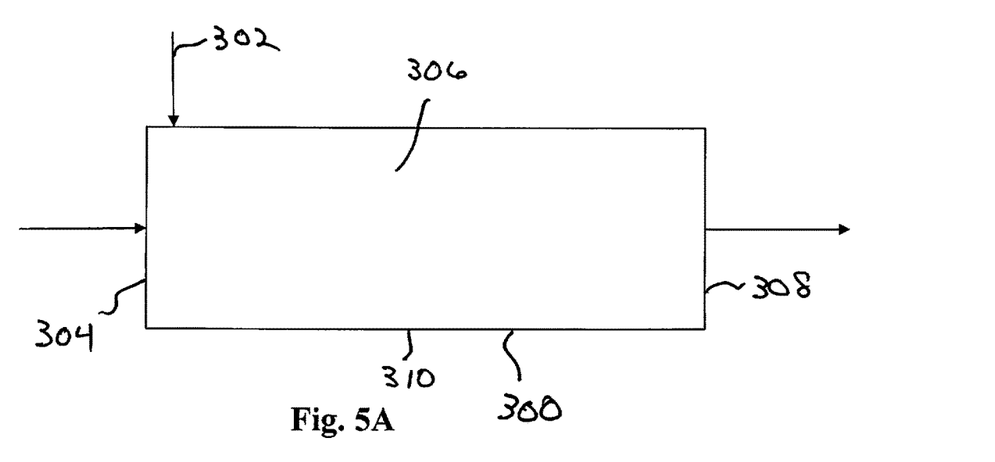
FIG. 5A is schematic illustration of a poultry carcass water chiller tank according to the prior art.
Figure 5B:
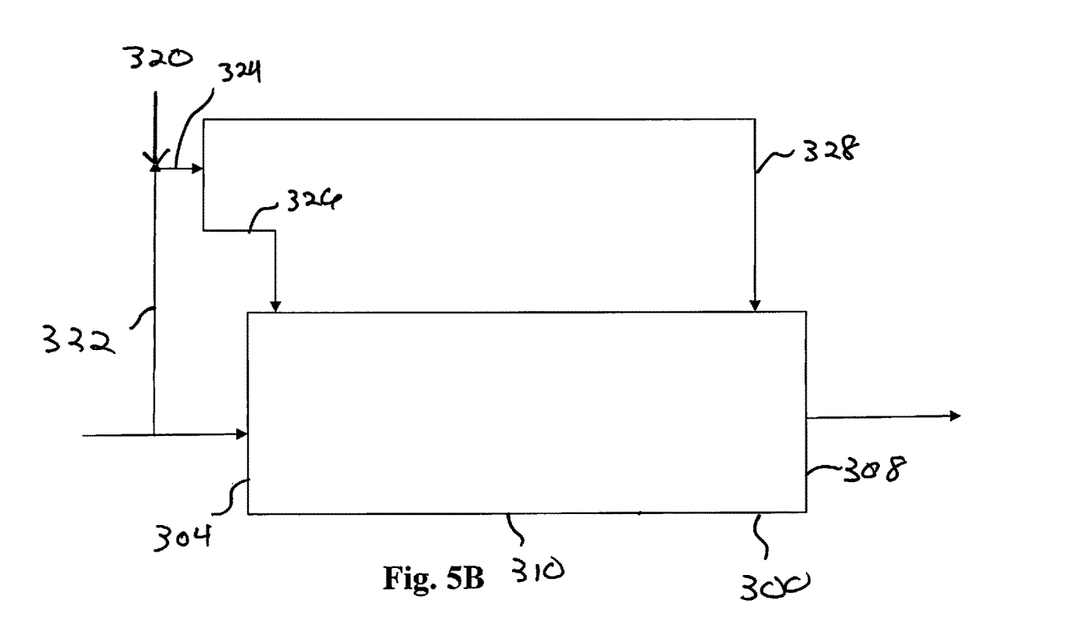
FIG. 5B is a schematic illustration of a poultry carcass water chiller tank according to a representative embodiment of the present invention.

In order to evaluate the efficacy of the present invention, a test was conducted to compare the performance of a conventional poultry chiller tank as represented by FIG. 5A and an improved poultry chiller tank utilizing a side stream to introduce an antimicrobial agent as represented by FIG. 5B. In each case, an antimicrobial agent comprising PAA was introduced into a poultry chiller tank 300 with a target PAA concentration of 30 ppm in the poultry chiller tank 300. Poultry chiller tank 300 comprised a 65 foot long tank with a volume of 40,000 gallons. Poultry chiller tank 300 had a poultry carcass load of greater than 34,000 and the carcass processing rate was the same for both tests.

With the conventional poultry chiller tank as represented by FIG. 5A, a concentrated antimicrobial solution 302 was added at a carcass introduction end 304 of the poultry chiller tank 300. In the present case, antimicrobial solution 302 comprised a solution of water and PAA. During a production shift, samples of a chiller tank solution 306 were taken at the carcass introduction end 304, a carcass removal end 308 and a chiller tank midpoint 310. The time weighted average of 5 samples at each location were:

Carcass Introduction End: 35 ppm
Chiller Tank Midpoint: 26 ppm
Carcass Removal End: 15 ppm As can be seen in the sample measurements, a significant length of poultry chiller tank 300 experienced concentrations of PAA significantly below the desired level of 30 ppm. More specifically, poultry carcasses near that carcass removal end 308 were exposed to chiller tank solution having half of the desired concentration of PAA. The carcass introduction end 304 experienced a slightly higher level of PAA due to the injection of the concentrated antimicrobial solution 302 as well as PAA carryover on poultry carcasses from the prior processing step.

With the poultry chiller tank design of the present invention as show in FIG. 5B, a PAA solution 320 is introduced and mixed into a side stream 322 to form a processing solution 324 having a PAA concentration of 30 ppm. Processing solution 324 comprised a first processing solution 326 that was introduced into the chiller tank 300 at the carcass introduction end 304 while a second processing solution 328 was introduced into the chiller tank 300 at the carcass removal end 308. During a production shift, samples of the chiller tank solution 306 were taken at the carcass introduction end 304, the carcass removal end 308 and the chiller tank midpoint 310. The time weighted average of 5 samples at each location were:

Carcass Introduction End: 32 ppm
Chiller Tank Midpoint: 28 ppm
Carcass Removal End: 27 ppm As can be seen in the sample measurements, the poultry chiller tank design of the present invention had a much lower concentration gradient across the length of the poultry chiller tank 300 with the chiller tank solution 306 at the chiller tank midpoint 310 and carcass removal end 308 being much closer to the desired concentration level of 30 ppm. As measured, the poultry chiller tank design of the present invention is capable of maintaining plus or minus 3 ppm of PAA within the chiller tank solution 306 across the length of the poultry chiller tank 300.

While the design illustrated in 5B utilized introduction of only a first processing solution 326 and a second processing solution 328, processing solution 324 can be further divided into additional processing solution streams that can be introduced at additional locations within the poultry chiller tank 300. For example, processing solution 324 could be further divided into a third processing solution also having a PAA concentration of 30 ppm and said third processing solution could be introduced, for example, at the chiller tank midpoint 310.

Figure 6:
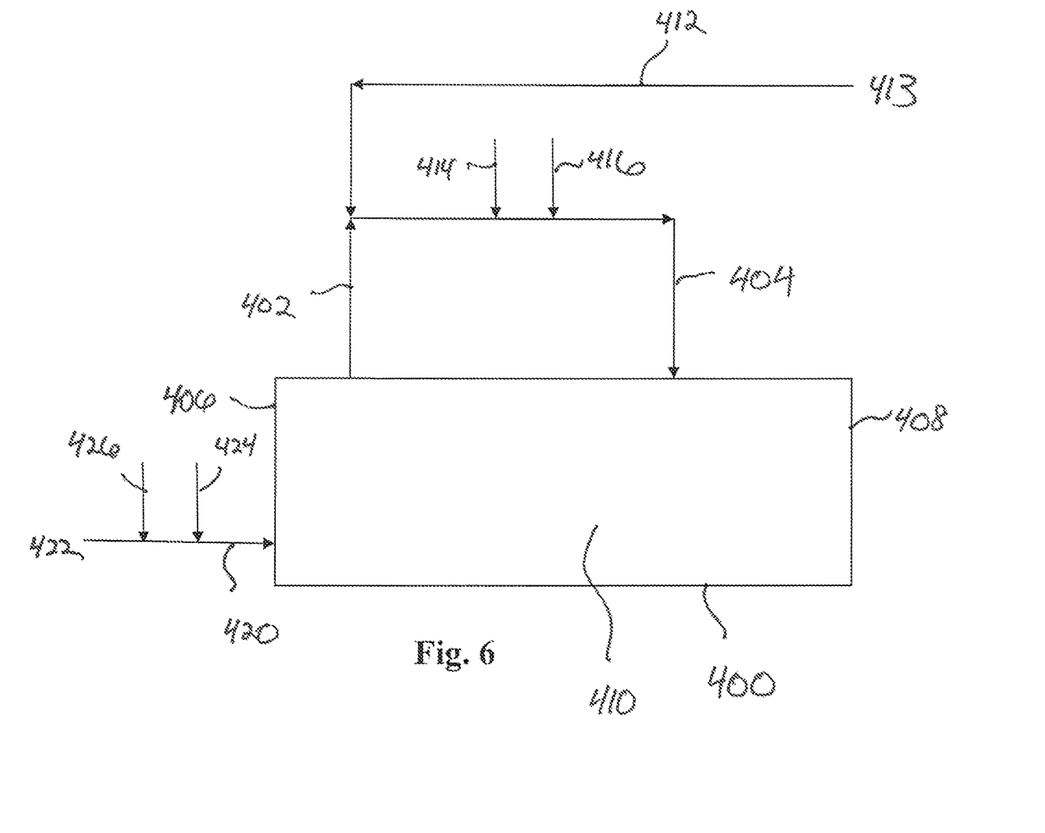
FIG. 6 is a schematic illustration of a poultry carcass water chiller tank according to a representative embodiment of the present invention.

Another representative embodiment of a poultry chiller tank 400 is illustrated generally in FIG. 6. In a manner similar to the previously described embodiments, poultry chiller tank 400 can include a recirculation line 402 for introducing a PAA solution 404 to one or more locations of the poultry chiller tank 400 between a carcass introduction end 406 and a carcass removal end 408. In addition to recirculating a tank solution 410 from the poultry chiller tank 400, a downstream processing stream 412 can be used to supply make-up water through the recirculation line 402. Downstream processing stream 412 can comprise an aqueous solution that can include an anti-microbial component, such as PAA, from a downstream operation 413, for example, a de-boning station or final rinse/bath prior to packaging, wherein the organic load is reduced as compared to the upstream poultry chiller tank 400. Recirculation line 402 can comprise a recirculation pH adjustment stream 414 as well as a recirculation PAA adjustment stream 416 such that the PAA solution 404 has a desired PAA concentration, for example, between 15 ppm and about 100 ppm, preferably between about 15 ppm and about 75 ppm, and in some other aspects between about 20 ppm and 50 ppm. In addition, poultry chiller tank 400 can comprise another source of PAA solution, for example, a fresh PAA solution 420. Fresh PAA solution 420 can comprise a tank or piping system where a source of fresh or otherwise filtered water 422 is adjusted with a fresh PAA adjustment stream 424 and/or a fresh pH adjustment stream 426 such that the fresh PAA solution 420 has a desired PAA concentration that is substantially equivalent to PAA solution 404. Through the introduction of both PAA solution 404 and fresh PAA solution 420 having equivalent PAA concentrations, the PAA concentration gradient within the poultry chiller tank 400 can be reduced.

In some aspects, the pH adjustment product is an alkalizing agent approved for direct food contact. In some aspects, the alkalizing agent is chosen from alkali metals and alkali earth metals, including sodium hydroxide and/or potassium hydroxide and/or the sodium and/or potassium salts of carbonic acid and/or phosphoric acid and/or silicic acid and/or other alkaline chemistries.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

The invention claimed is:

1. A method for increasing antimicrobial efficacy in a poultry chiller tank, the method comprising:
    providing a poultry chiller tank having one or more poultry carcasses within a processing solution consisting of one or more peroxycarboxylic acids having a pH above 7.0 and below about 10.0 and a desired concentration between about 1 ppm and about 5000 ppm;
    providing a flowing water supply to an inlet portion of an inflow pipe, the inflow pipe in fluid communication with the poultry chiller tank, and the inlet portion of the inflow pipe proximately located outside of the poultry chiller tank;
    adding a pH adjustment product to the flowing water supply in the inlet portion of the inflow pipe to provide a pH adjustment processing water within the inlet portion of the inflow pipe, the pH adjustment processing water having a desired pH between about 7 and about 10;
    mixing a peroxycarboxylic acid solution with the pH adjustment processing water within the inlet portion of the inflow pipe, wherein the mixing of the pH adjustment processing water with the peroxycarboxylic acid modifies the pH of the peroxycarboxylic acid solution to provide a pH adjusted processing solution having a pH above 7.0 and below about 10.0 and a concentration between about 1 ppm and about 5000 ppm within the inlet portion of the inflow pipe;
    optionally measuring the pH of the pH adjusted processing solution, the pH adjustment processing water, or both, wherein the optional measuring occurs proximately within the inlet portion of the inflow pipe;
    dividing the pH adjusted processing solution into at least a first processing solution stream and a second processing solution stream; and
    introducing simultaneously the first and second processing solution streams into at least two locations of the poultry chiller tank, wherein the at least two locations include at least a poultry introduction end of the poultry chiller tank into which the first processing solution stream is introduced and a poultry removal end of the poultry chiller tank into which the second processing solution stream is introduced;
    wherein the first and second processing solution streams introduced into the poultry chiller tank maintains a concentration gradient of the processing solution across a processing length of the poultry chiller tank that is less than about 10 ppm.

2. The method of claim 1, wherein the step of dividing the processing solution further comprises dividing the processing solution into a third processing solution stream and wherein the step of introducing simultaneously the first and second processing solution streams further comprises introducing simultaneously the first, second and third processing solution streams and wherein the third processing solution stream is introduced into a third location of the poultry chiller tank, said third location being located at a position between the poultry introduction end and the poultry removal end, and wherein the first, second and third processing solution streams introduced into the poultry chiller tank maintain the concentration gradient of the processing solution across the processing length of the poultry chiller tank that is less than about 10 ppm.

3. The method of claim 1, further comprising:
    heating the pH adjusted processing solution prior to dividing the processing solution into the first and second processing streams.

4. The method of claim 1, further comprising:
    measuring the concentration of the pH adjusted processing solution within the inlet portion of the inflow pipe to confirm the desired concentration of the peroxycarboxylic acid prior to introduction of a plurality of processing solution streams into a plurality of locations of the poultry chiller tank.

5. The method of claim 4, further comprising:
    measuring the concentration of the processing solution in the poultry chiller tank.

6. The method of claim 1, wherein the peroxycarboxylic acid solution comprises peroxyacetic acid (PAA).

7. The method of claim 6, wherein the desired concentration of the PAA is between about 15 ppm and about 75 ppm.

8. The method of claim 7, wherein each of the plurality of processing solution streams comprises between 20 ppm and about 50 ppm PAA.

9. The method of claim 8, wherein the concentration gradient of PAA within the poultry chiller tank is less than about 3 ppm PAA.

10. The method of claim 1, wherein the pH adjustment product is added to the flowing water supply in the inlet portion of the inflow pipe through a metering pump.

11. The method of claim 1, wherein the concentration gradient is less than about 5 ppm.

12. The method of claim 1, wherein the concentration gradient is less than about 3 ppm.

13. The method of claim 1, wherein the concentration gradient is between about 2 ppm and about 8 ppm.

14. The method of claim 1, wherein the flowing water supply is provided from a recirculating tank.

15. The method of claim 1, wherein the flowing water supply is provided from a red water loop processing system.

16. The method of claim 1, the pH adjustment product is an alkalizing agent approved for direct food contact.

17. The method of claim 1, the pH adjustment product is an alkalizing agent chosen from an alkali metal and an alkali earth metal.

18. The method of claim 17, the pH adjustment product is chosen from sodium hydroxide, potassium hydroxide, sodium salt of carbonic acid, potassium salt of carbonic acid, phosphoric acid, and silicic acid.

19. The method of claim 1, wherein the pH of the pH adjusted processing solution and the pH of the adjustment processing water are continually monitored in the inlet portion of the inlet pipe.

20. The method of claim 1, wherein the concentration gradient is between about 1 ppm and about 10 ppm.

21. A method for increasing antimicrobial efficacy in a poultry chiller tank, the method comprising:
providing a poultry chiller tank having one or more poultry carcasses within a processing solution having one or more peroxycarboxylic acids at a pH above 7.0 and below about 10.0 and a concentration between about 1 ppm and about 5000 ppm;
providing a pH adjusted processing solution to an inlet portion of an inflow pipe, the inflow pipe in fluid communication with the poultry chiller tank, and the inlet portion of the inflow pipe proximately located outside of the poultry chiller tank, wherein the pH adjusted processing solution comprises a pH adjustment product mixed with a peroxycarboxylic acid solution outside of the poultry chiller tank, and wherein the pH adjusted processing solution having a desired pH between about 7 and about 10 and a desired concentration between about 1 ppm and about 5000 ppm; and
introducing the pH adjusted processing solution having the desired pH between about 7 and about 10 and the desired concentration between about 1 ppm and about 5000 ppm from the inlet portion into the poultry chiller tank having the one or more poultry carcasses;
wherein the pH adjusted processing solution introduced into the poultry chiller tank is capable of maintaining a concentration gradient of the processing solution across a processing length of the poultry chiller tank that is less than about 10 ppm.

22. The method of claim 21, further comprising mixing the pH adjustment product with the peroxycarboxylic acid solution in at least a portion of the inlet portion of the inflow pipe proximately located outside of the poultry chiller tank to provide the pH adjusted processing solution having the desired pH between about 7 and about 10 and the desired concentration between about 1 ppm and about 5000 ppm in the inlet portion of the inflow pipe.

23. The method of claim 21, wherein the peroxycarboxylic acid solution comprises peroxyacetic acid (PAA).

24. The method of claim 23, wherein the desired concentration of the PAA is between about 10 ppm and about 200 ppm.

25. The method of claim 24, wherein the concentration gradient of PAA within the poultry chiller tank is less than about 5 ppm PAA.

26. The method of claim 23, wherein the desired concentration of the PAA is between about 15 ppm and about 100 ppm.

27. The method of claim 26, wherein the concentration gradient of PAA within the poultry chiller tank is less than about 8 ppm PAA.

28. The method of claim 26, wherein the concentration gradient of PAA within the poultry chiller tank is less than about 5 ppm PAA.

29. The method of claim 23, wherein the pH adjusted processing solution further comprises water provide from a flowing water supply.

30. The method of claim 29, wherein the flowing water supply is at least partially provided from a recirculating tank.

31. The method of claim 29, wherein the flowing water supply is at least partially provided from a red water loop processing system.

32. The method of claim 21, wherein the pH adjustment product is an alkalizing agent chosen from an alkali metal and an alkali earth metal.

33. The method of claim 32, wherein the pH adjustment product is chosen from sodium hydroxide, potassium hydroxide, sodium salt of carbonic acid, potassium salt of carbonic acid, phosphoric acid, and silicic acid.

34. The method of claim 21, wherein the peroxycarboxylic acid solution comprises PAA, the desired concentration of the PAA is between about 10 ppm and about 200 ppm, the pH adjustment product comprises sodium hydroxide, potassium hydroxide, or a combination thereof, and the concentration gradient of PAA within the poultry chiller tank is less than about 8 ppm PAA.

35. A method for increasing antimicrobial efficacy in a poultry processing tank, the method comprising:
providing a premixed pH adjusted processing solution to an inlet portion of an inflow pipe for a poultry processing tank, wherein the inlet portion of the inflow pipe proximately located outside of the poultry processing tank, wherein the premixed pH adjusted processing solution comprises a pH adjustment product and a solution of one or more peroxycarboxylic acids, and wherein the premixed pH adjusted processing solution having a desired pH between about 7 and about 10 and a desired concentration between about 1 ppm and about 2000 ppm;
introducing the premixed pH adjusted processing solution from the inlet portion into the poultry processing tank providing a poultry processing solution within the poultry processing tank, wherein the poultry processing solution within the poultry processing tank having the desired pH between about 7 and about 10 and the desired concentration between about 1 ppm and about 2000 ppm;
processing at least a portion of one or more poultry carcasses within the poultry processing solution of the poultry processing tank; and optionally measuring the pH of the premixed pH adjusted processing solution, the poultry processing solution, or both;

wherein the premixed pH adjusted processing solution introduced into the poultry chiller tank maintains the poultry processing solution within the poultry processing tank at the desired pH between about 7 and about 10 and the desired concentration between about 1 ppm and about 5000 ppm during processing at least the portion of one or more poultry carcasses.

36. The method of claim 35, further comprising mixing the pH adjustment product and the solution of one or more peroxycarboxylic acids within an ancillary system outside of the poultry processing tank to provide the premixed pH adjusted processing solution having the desired pH between about 7 and about 10 and the desired concentration between about 1 ppm and about 2000 ppm, wherein the ancillary system is in fluid communication with the inlet portion of the inflow pipe.

37. The method of claim 36, wherein the ancillary system comprises a mixing tank.

38. The method of claim 37, wherein the mixing tank is capable of providing the premixed pH adjusted processing solution having the desired pH between about 7 and about 10 and the desired concentration between about 1 ppm and about 2000 ppm to the inlet portion of the inflow pipe.

39. The method claim 37, wherein the pH of the premixed pH adjusted processing solution is measured prior to introduction to the poultry processing tank.

40. The method of claim 37, wherein the solution of one or more peroxycarboxylic acids comprises peroxyacetic acid (PAA).

41. The method of claim 40, wherein the desired concentration of the PAA is between about 10 ppm and about 1000 ppm.

42. The method of claim 40, wherein the desired concentration of the PAA is between about 15 ppm and about 200 ppm.

43. The method of claim 40, wherein the desired concentration of the PAA is between about 15 ppm and about 100 ppm.

44. The method of claim 37, wherein the pH adjustment product is an alkalizing agent chosen from an alkali metal and an alkali earth metal.

45. The method of claim 44, wherein the pH adjustment product is chosen from sodium hydroxide, potassium hydroxide, sodium salt of carbonic acid, potassium salt of carbonic acid, phosphoric acid, and silicic acid.

46. The method of claim 37, wherein the solution of one or more peroxycarboxylic acids comprises PAA and the pH adjustment product comprises sodium hydroxide and/or potassium hydroxide.

47. The method of claim 46, wherein the desired concentration of the PAA is between about 10 ppm and about 1000 ppm.

48. The method of claim 46, wherein the desired concentration of the PAA is between about 15 ppm and about 200 ppm.

49. The method of claim 46, wherein the desired concentration of the PAA is between about 15 ppm and about 100 ppm.

50. The method of claim 49, wherein the pH of the poultry processing water is measured outside of the poultry processing tank.

51. The method of claim 46, wherein the pH of the poultry processing water is measured in a recirculation loop, a bypass loop, the inlet portion, the inflow pipe, or an overflow portion of the poultry processing water having exited the poultry processing tank.

52. The method of claim 37, wherein the solution of one or more peroxycarboxylic acids comprises PAA, the desired concentration of the PAA is between about 10 ppm and about 1000 ppm, the pH adjustment product comprises sodium hydroxide, potassium hydroxide, or a combination thereof, and the desired pH is between about 7.5 and about 9.5.

53. The method of claim 52, wherein the desired concentration of the PAA is between about 15 ppm and about 200 ppm, the pH adjustment product comprises sodium hydroxide, potassium hydroxide, or a combination thereof, and the desired pH is between about 7.2 and about 8.6.

54. The method of claim 52, wherein the premixed pH adjusted processing solution is continuously introduced from the mixing tank to the poultry processing tank during processing of the one or more poultry carcasses.

55. The method of claim 52, wherein the poultry processing tank is a chiller tank.

56. The method of claim 37, wherein the poultry processing tank is a chiller tank.

57. The method of claim 34, wherein the poultry processing tank is a chiller tank or a dip tank.

58. The method of claim 34, further comprising mixing the pH adjustment product and the solution of one or more peroxycarboxylic acids within an ancillary piping system outside of the poultry processing tank to provide the premixed pH adjusted processing solution having the desired pH between about 7 and about 10 and the desired concentration between about 1 ppm and about 2000 ppm, wherein the ancillary piping system is in fluid communication with the inlet portion of the inflow pipe.

59. The method of claim 58, wherein the ancillary piping system comprises a portion of the inflow pipe.

60. The method claim 59, wherein the pH of the premixed pH adjusted processing solution is measured prior to introduction to the poultry processing tank.

61. The method of claim 59, wherein the solution of one or more peroxycarboxylic acids comprises peroxyacetic acid (PAA).

62. The method of claim 61, wherein the desired concentration of the PAA is between about 10 ppm and about 1000 ppm.

63. The method of claim 61, wherein the desired concentration of the PAA is between about 15 ppm and about 200 ppm.

64. The method of claim 61, wherein the desired concentration of the PAA is between about 15 ppm and about 100 ppm.

65. The method of claim 59, wherein the pH adjustment product is an alkalizing agent chosen from an alkali metal and an alkali earth metal.

66. The method of claim 65, wherein the pH adjustment product is chosen from sodium hydroxide, potassium hydroxide, sodium salt of carbonic acid, potassium salt of carbonic acid, phosphoric acid, and silicic acid.

67. The method of claim 59, wherein the solution of one or more peroxycarboxylic acids comprises PAA and the pH adjustment product comprises sodium hydroxide and/or potassium hydroxide.

68. The method of claim 67, wherein the desired concentration of the PAA is between about 10 ppm and about 1000 ppm.

69. The method of claim 67, wherein the desired concentration of the PAA is between about 15 ppm and about 200 ppm.

70. The method of claim 69, wherein the poultry processing tank is a chiller tank.

71. The method of claim 67, wherein the desired concentration of the PAA is between about 15 ppm and about 100 ppm.

72. The method of claim 67, wherein the pH of the poultry processing water is measured in a recirculation loop, a bypass loop, the inlet portion, the inflow pipe, or an overflow portion of the poultry processing water having exited the poultry processing tank.

73. The method of claim 59, wherein the solution of one or more peroxycarboxylic acids comprises PAA, the desired concentration of the PAA is between about 10 ppm and about 1000 ppm, the pH adjustment product comprises sodium hydroxide, potassium hydroxide, or a combination thereof, and the desired pH is between about 7.5 and about 9.5.

74. The method of claim 59, wherein the desired concentration of the PAA is between about 15 ppm and about 200 ppm, the pH adjustment product comprises sodium hydroxide, potassium hydroxide, or a combination thereof, and the desired pH is between about 7.2 and about 8.6.

75. The method of claim 52, wherein the premixed pH adjusted processing solution is continuously introduced from the inlet portion of the inflow pipe to the poultry processing tank during processing of at least the portion of one or more poultry carcasses.

76. The method of claim 75, wherein the poultry processing tank is a chiller tank.

77. The method of claim 59, wherein the poultry processing tank is a chiller tank.

78. The method of claim 59, wherein the poultry processing tank is a dip tank.

* * * * *